May 22, 1928.  1,670,344
C. D. COLLINS
DUSTING APPARATUS
Filed March 5, 1926
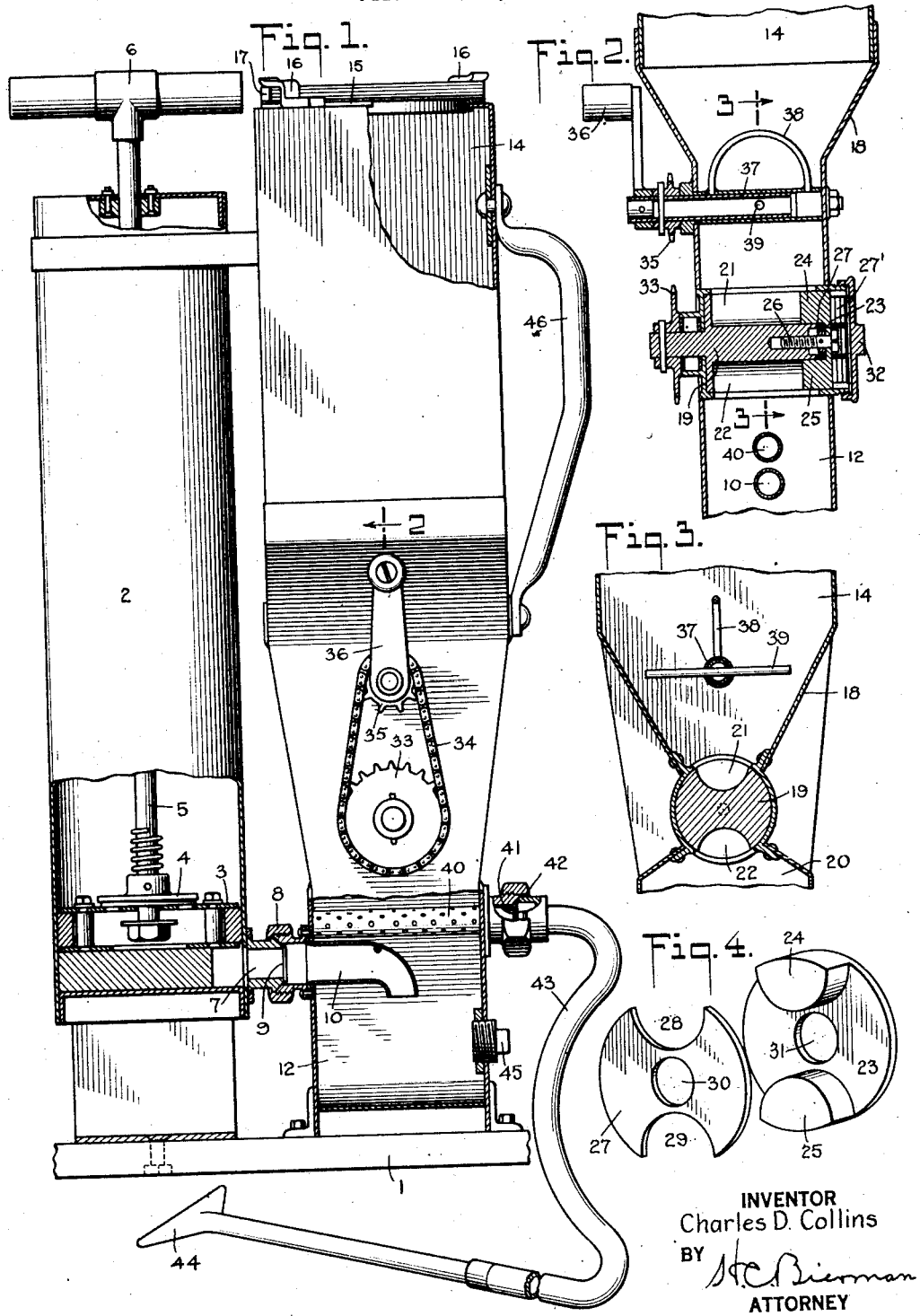
INVENTOR
Charles D. Collins
BY
ATTORNEY Patented May 22, 1928.

1,670,344

UNITED STATES PATENT OFFICE.

CHARLES D. COLLINS, OF NEW YORK, N. Y., ASSIGNOR TO AMERICAN CYANAMID COMPANY, OF NEW YORK, N. Y., A CORPORATION OF MAINE.

DUSTING APPARATUS.

Application filed March 5, 1926. Serial No. 92,455.

This invention relates to means for distributing a solid fumigant, more particularly to an apparatus capable of accurately and rapidly measuring and ejecting such fumigants.

Of recent years there has come into general use a material known as Cyanogas, which is a solid calcium cyanide. This material is perfectly stable, may be stored for long periods of time and may be transported over long distances without any substantial amount of decomposition if kept in sealed containers. Upon exposure to the air it reacts very rapidly with the moisture contained in the air, liberating hydrocyanic acid gas which constitutes the fumigant which is capable of eradicating various animal and insect pests. In order to distribute this dusting material, several different types of apparatus have been evolved but none of them have been entirely satisfactory.

It is necessary in apparatus of this character that the same be readily portable by hand in order that the operator may easily carry the same from place to place where fumigation is to be done. Such fumigation may be in the burrows of animals, such as rabbits, gophers, rats and the like, in warehouses, freight cars and ships, or may be under tents covering citrus or other trees. In any case it is necessary that the apparatus be capable of accurately measuring predetermined amounts of the material because it is necessary to obtain a toxic mixture for the pests to be exterminated, and in the case of citrus trees and the like a definite mixture, as too great dosage or concentration of gas is harmful to the trees. The apparatus must, therefore, be capable of adjustment so that the size of the units of material may be varied in accordance with a scale of schedules such as is commonly used in the fumigation of citrus trees. The apparatus must be simple in construction and rugged, and must be accurate to a very fine degree.

It is among the objects of this invention to provide an apparatus for dusting or distributing a solid fumigant which shall be simple in construction, easily dismembered for inspection or repair purposes, shall be adjustable to vary the units of dosage of the dusting material and shall also be adjustable to vary the proportions of fumigant and air ejected from the apparatus.

In practicing my invention, I provide a chamber for holding the dusting material and provide rotary means, generally a plug having one or more depressions therein, into which the material falls and is removed to a receiver or ejecting chamber. An air pump associated with the apparatus is capable of delivering a supply of air under pressure into the receiver whereby it becomes mixed with the dusting material which is carried out of the apparatus and through a nozzle into the space to be fumigated. Means are provided for changing the size of the depression or depressions in the plug in order to vary the unit by a predetermined amount and means are also provided for changing the proportions of air and dusting material in the mixture ejected from the receiver.

In the accompanying drawing constituting a part hereof and in which like reference characters indicate like parts:

Fig. 1 is a front elevational view of my new apparatus, some parts being broken away and other parts being shown in section for clearness;

Fig. 2 is a fragmentary, vertical, cross-sectional view taken along the line 2—2 of Fig. 1;

Fig. 3 is a similar view taken along the line 3—3 of Fig. 2, and

Fig. 4 is an enlarged detail view of the means for adjusting the size of the depressions in the plug.

Upon the base 1 of the apparatus is mounted a pump, consisting of a cylinder 2, a piston 3 therein having a valve 4 associated therewith, and a piston rod 5 secured to the valve 4, the outer end of the piston rod being provided with a handle 6, all as is well known and commonly used. An opening in the bottom of the cylinder 2 communicates with a member 7 which constitutes a part of a union 8. To the member 7 is hinged a flap valve 9 which is adapted to open in a direction away from the opening in the cylinder 2 and constitutes in effect a check valve therefor. A tube 10 having a restricted curved end opening downwardly is fixed in the other end of the union 8 and extends into the receiver 12 which is secured to the base 1, the lower end 13 of the receiver being curved so that the section thereof is U-shaped.

Mounted upon the receiver 12 and integral therewith is a chamber 14, for the material to be dusted, having an opening in the top thereof closed by a cover 15 which is held in place by the cooperation of lugs 16 secured to the chamber 14 and engaging the ends of a bar 17 fixed to the cover 15. The lower end 18 of chamber 14 is tapered and communicates with the plug 19 seated therein, the opposite side of the plug communicating with the top 20 of receiver 12.

The plug 19 consists essentially of a solid or cored cylindrical member having opposite depressions 21 and 22 preferably of semi-circular cross-section formed therein, the open end of the plug being closed by a member 23 which consists of a plate having projections 24 and 25 formed thereon as shown in Fig. 4, the said projections being of such size and shape as to fit into the free ends of depressions 21 and 22 respectively as shown in Fig. 2. The member 23 is secured to the plug by means of a screw and thread arrangement 26. In order to adjust the width and thus the capacity of the depressions, there are provided a number of plates 27, of predetermined thickness, having cut-out portions 28 and 29 corresponding to the projections 24 and 25 respectively, of member 23, and having centrally located openings 30, corresponding to a similar opening 31 in member 23 and adapted to fit over the end of the plug 19. When it is desired to increase, for instance, the width of the depressions 21 and 22, the member 23 is removed from the plug by re-tracing the screw 26 and one or more of the plates 27 are placed upon the member 23 as indicated in the exploded view of Fig. 4, and the assembly is then replaced upon the plug, the screw 26 holding the same in position. In Fig. 2 there are shown two such plates or spacers 27 in adjustable position. Additional spacers 27' are placed at the outer side of the member 23 and constitute a reserve supply, the same being held in position by means of the cover 32 which is threaded on a suitable projecting portion of the apparatus.

A sprocket 33 is secured to the plug, making connection by means of a chain 34 with a sprocket 35 having an operating handle 36 secured thereto. The sprocket in turn is secured to a shaft 37, parallel to the axis of plug 19 and at a slight distance above the same. A wire loop 38 is secured to the shaft 37 and a long pin 39 passes through the same in a direction at right angles to the plane of the loop, the whole constituting a stirring device for the material in chamber 14.

A perforated tube 40 projects into receiver 12 and its outer end 41 is supported in one portion of unit 42, the said support constituting the only means for holding the same in position. The outer end of the unit 42 communicates with a flexible hose 43 at the outer end of which is a distributing nozzle 44. A plug 45 in receiver 12 constitutes means for inspecting and cleaning the said receiver. A handle 46 is secured to the side of chamber 14 whereby the apparatus may be conveniently lifted and carried from place to place.

In the operation of this apparatus the cover 15 is removed and the chamber 14 is filled with Cyanogas or other material to be dusted, and the cover replaced and locked in position by means of clips 16. The handle 36 is then rotated, each complete revolution of the handle causing one-half revolution of the plug, whereby one of the depressions therein is filled with material which is transported to the receiver 12 and dumped therein. A predetermined number of units of material are transported into the receiver by a corresponding number of revolutions of handle 36. Simultaneously therewith the shaft 37 and the stirring members 38 and 39 are rotated, loosening any material in the chamber 14 that might tend to hang or pack and thereby insuring a uniform amount of material being deposited in the depressions 21 and 22 of plug 19. The distributing nozzle 44 is placed in communication with the space to be fumigated and the handle 6 of pump 2 is reciprocated, thereby causing a blast of air to pass through tube 10 into receiver 12 where it takes up the powdered material and flows through the openings in tube 40, then passing through the flexible members 43, the nozzle 44 and into the space to be fumigated.

Under different circumstances it is often desirable to change the relative proportions of air and solid material and to accomplish this, I provide a plurality of tubes 40 having openings of different sizes. If it is desired to change the ratio of air to material, the unit 42 is unscrewed, the tube 40 is removed by slipping the free end 41 out of chamber 12 and another tube with larger or smaller openings as the case may be is inserted in place thereof. This changes the ratio of air to fumigant to a smaller or greater proportion in such case.

In this apparatus I have succeeded in overcoming practically all of the difficulties encountered in the use of prior devices for this purpose and I have obviated all the disadvantages thereof. All the parts of my apparatus are readily accessible for the purpose of cleaning or repair and different factors involved in the fumigation of various types may be taken into account and adjusted by means of my apparatus. For instance, the units of material used may be varied as described, in accordance with the usual practice in the fumigation of citrus trees with liquid hydrocyanic acid. The relative volumes or air and material may be changed depending upon the concentration of fumigation desired in any space. By provision of a flap valve 9 in the union 8, I have eliminated the objection to prior valves of sticking and my valve is very readily accessible for replacement or inspection which is obtained by merely loosening the said union. The bottom of receiver 12 being formed in a U shape allows the current of air passing through the end 11 of tube 10, to completely sweep out the material therein, thus insuring that at each operation, the measured dosage will actually be delivered to the space being fumigated.

It is of course obvious that the form of apparatus herein shown and described is not the only form thereof which comes under my invention. For instance, the reciprocating pump 2 may be replaced by a bellows or by a centrifugal blower or fan or any other source of gas pressure. The means for driving the stirring device and the rotary plug may be different from that shown and various other details of the construction of my apparatus may be changed as will be apparent to those skilled in the art.

What I claim is:

1. A dusting device comprising a chamber for holding dusting material, rotary means for measuring definite quantities thereof, a receiver therefor, a source of gas pressure and a tube from said source extending into said chamber, the free end of said tube being directed in a downward direction and a perforated exit tube in the upper portion of said chamber.

2. A dusting device comprising a chamber for holding dusting material, rotary means for measuring definite quantities thereof, a receiver therefor, a source of gas pressure and a tube from said source extending into said chamber, the free end of said tube being directed in a downward direction and a perforated exit tube in the upper portion of said chamber and a separable connection between said source and said chamber.

3. A dusting device comprising a chamber for holding dusting material, rotary means for measuring definite quantities thereof, a receiver therefor, a source of gas pressure and a tube from said source extending into said chamber, the free end of said tube being directed in a downward direction and a perforated exit tube in the upper portion of said chamber, said exit tube being substantially uniform in diameter.

4. A dusting device comprising a chamber for holding dusting material, rotary means for measuring definite quantities thereof, a receiver therefor, a source of gas pressure and a tube from said source extending into said chamber, the free end of said tube being directed in a downward direction and a perforated exit tube in the upper portion of said chamber, said exit tube being removably secured in said chamber.

In testimony whereof, I have hereunto subscribed my name this 18th day of February 1926.

CHARLES D. COLLINS.